United States Patent

Meserole

[15] 3,689,114
[45] Sept. 5, 1972

[54] SLEEVE FOR COUPLING TWO SECTIONS OF DUCT OR CONDUIT

[72] Inventor: Robert H. Meserole, Somerville, N.J.

[73] Assignee: Johns-Manville Corporation, New York, N.Y.

[22] Filed: Nov. 9, 1970

[21] Appl. No.: 87,812

[52] U.S. Cl. ............285/373, 285/21, 285/284, 285/419, 287/111, 285/424
[51] Int. Cl. ...........................................F16l 21/06
[58] Field of Search......285/373, 424, 419, 287, 284, 285/417, 293, 15, 21; 138/149, 148, 153, 99; 287/108, 110, 111

[56] References Cited

UNITED STATES PATENTS 1,704,760  3/1929  Parker....................138/99
1,032,078  7/1912  Osborn..................285/419 X
2,367,191  1/1945  Bailey et al. ...........285/419 X
3,379,218  4/1968  Conde....................138/99

Primary Examiner—David J. Williamowsky
Assistant Examiner—Wayne L. Shedd
Attorney—John A. McKinney and Robert M. Krone

[57] ABSTRACT

A sheet metal sleeve formed to a cylindrical shape and having a lap joint thereby permitting expansion of the sleeve to be received over adjacent ends of two ducts in hugging embrace therewith for coupling the duct sections in axial communication. The inside of the sleeve is provided with a heat melting adhesive adapted for fixedly securing the sleeve on the ends and sealing the joint between the duct and sleeve.

6 Claims, 6 Drawing Figures

PATENTED SEP 5 1972
3,689,114
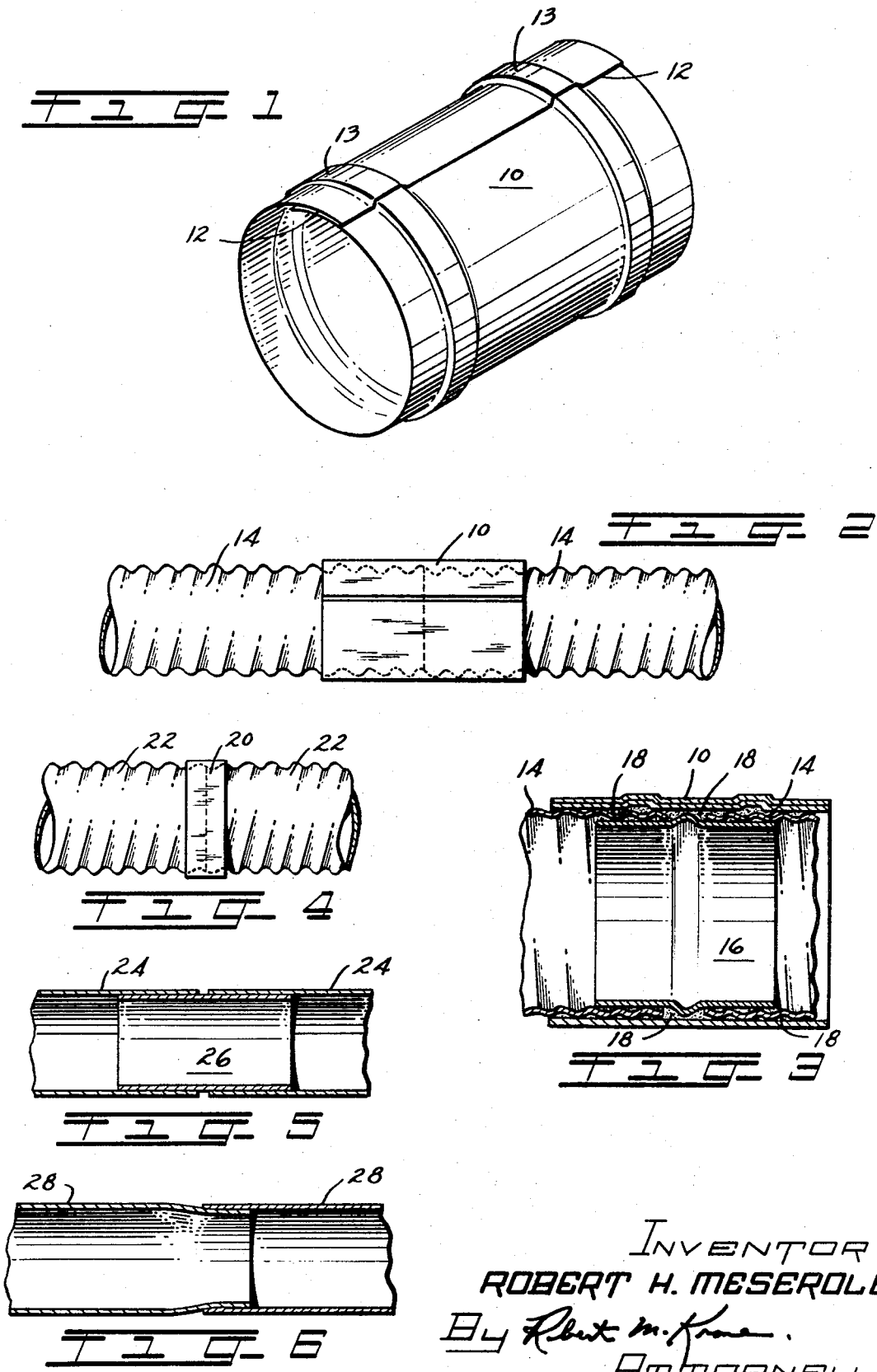
INVENTOR
ROBERT H. MESEROLE
By Robert M. Krone
ATTORNEY

SLEEVE FOR COUPLING TWO SECTIONS OF DUCT OR CONDUIT

BACKGROUND OF THE INVENTION

This invention relates to an expansible lap jointed sheet metal sleeve adapted for hugging embrace around adjacent ends of aligned duct sections for joining them in axial communication. The expansible sleeve is formed to a relaxed diameter smaller than the diameter of the duct sections over which it is to be received. The inside of the sleeve is provided with an adhesive adapted to be melted by application of heat so that it flows into the spaces between the sleeve and duct sections for securing them together and providing a sealing substance therebetween.

Present practices for joining two sections of duct are numerous. They include the use of rivets, banded sections, mechanically securing one duct end inside another, sheet metal sleeves, tape and heat shrinkable plastic sleeves. Most of these connections are difficult and require field installation which is relatively expensive. The present invention is concerned with a preformed or rolled cylindrical sleeve having an expansible lap joint whereby the sleeve can be expanded by manual force to a larger diameter to be received over ends of aligned duct sections for coupling them in alignment. The thermal setting adhesive on the inside of the sleeve is then melted by use of a flame torch or electrical heating means for properly sealing the connection.

BRIEF SUMMARY OF THE INVENTION

It is an object of this invention to provide a cylindrical sleeve for coupling two duct sections in axial communication.

It is a further object of this invention to provide a rolled sheet metal cylindrical sleeve having a lap joint whereby the sleeve is expansible for coupling adjacent ends of duct sections in hugging embrace.

It is a still further object of this invention to provide an expansible lap jointed sheet metal sleeve having a heat responsive adhesive on the inside thereof adapted for melting at elevated temperatures to flow internally of the connection for securing and sealing the sleeve in position around the duct sections.

BRIEF DESCRIPTION OF THE DRAWINGS

The invention will be more fully understood and further advantages thereof will become apparent when reference is made to the following detailed description of the preferred embodiment of the invention and the accompanying drawings in which:

FIG. 1 is a perspective view of the rolled lap jointed sheet metal sleeve according to the present invention.

FIG. 2 illustrates the sleeve coupling two duct sections,

FIG. 3 is a cross-sectional view taken through a typical connection of two duct sections, FIG. 4 illustrates two sections of corrugated duct having a banded joint therebetween, FIG. 5 illustrates two plain cylindrical sections of duct having an internal sleeve and adapted for receiving a sleeve of the type disclosed herein, and FIG. 6 illustrates another form of duct connection adapted to receive a sleeve of the type disclosed herein.

DESCRIPTION OF THE PREFERRED EMBODIMENT

Referring to the drawings, in particular to FIG. 1, there is illustrated a rolled sheet metal sleeve 10 having a lap joint 12 running along the length thereof. The sleeve is formed of resilient sheet metal having sufficient resilient characteristics whereby it is adapted to be manually expanded at the lap joint to a larger diameter and then return to its original size. It is normally formed to a size which is smaller than the diameter of the duct sections over which it is to be received. As shown in FIG. 1 the cylindrical sleeve is provided with a pair of circumferential raised ridge 13 for providing rigidity of the sleeve and a track for one portion of the ridge to slide within another.

FIG. 2 illustrates sleeve 10 coupling adjacent ends of two sections of duct 14 in axial communication. FIG. 3 is a longitudinal cross-sectional view through a typical joint such as that disclosed in FIG. 2 showing sleeve 10 in hugging embrace around adjacent ends of duct sections 14. In this arrangement a sleeve 16 is provided internally at the ends of duct sections 14 for alignment thereof and for providing rigidity to the connection. Though the use of such an internal sleeve is old and not absolutely essential, its use provides a more stable joint between the sections, particularly when used in conjunction with the type of cylindrical sleeve disclosed herein. The internal surface of sleeve 10, including the overlapping portion, is provided with a heat responsive adhesive of a thickness of about one-eighth to one-fourth inch which is adapted upon being heated by a torch or other means to melt and flow into the voids such as 18 (FIG. 3) between the duct walls and the internal surface of sleeve 10 for providing a sealing and securing the joint.

Cylindrical sleeve 10 is formed by cold working thin gauge metal strip stock. It is rolled into sleeve form so as to be smaller in diameter than the size of duct over which it is to be installed. The sleeve is provided with a lap seam of sufficient overlap that it is retained after being expanded and received on a larger diameter duct. The same rolling operation also forms ridges 13. The entire inside surface of the spring-like sleeve, including the overlap, is coated with a hot melt adhesive. The spring-like characteristics of the sleeve force the heat softened adhesive against the surface of the duct walls adjacent the sleeve. After the adhesive has set, the parts are secured together.

FIG. 4 illustrates a metal or plastic sleeve 20 disposed around adjacent ends of duct section 22 as a substitute for internal sleeve 16 (FIG. 3). Heat shrinkable plastic sleeves are often used for this purpose. Tapes may also be wrapped therearound. The purpose of sleeves 20, or equivalent tape around these joints, in addition to its securing characteristics, is to prepare the joint for receiving a sleeve 10 and to prevent adhesive thereon when melted from passing to the inside of duct sections 22.

FIG. 5 illustrates smooth walled duct sections 24 formed of sheet metal or plastic and using an insert sleeve 26 for the purpose disclosed above. This joint is now ready to have applied thereto a sleeve 10 in hugging embrace therearound.

FIG. 6 illustrates another embodiment of duct sections 28 of sheet metal or plastic wherein one is received within the other at the joint and is adapted to receive a sleeve 10 as disclosed in FIG. 1.

While the sleeve is shown as generally cylindrical and having ridges for rigidity and tracking of one portion within another, the sleeve may be provided without ridges or have other surface configuration instead. The sleeve wall may be dimpled or corrugated to provide strength. The sleeve may be formed from material other than metal, for example, plastic or glass reinforced plastic having the desired resilient characteristics. The sleeve is resilient, and when expanded by outside forces, stresses are caused therein which tend to return the sleeve to its original size. Therefore, the sleeves huggingly embraces the outer periphery of duct ends of larger diameter over which it is placed.

The type sleeve disclosed and described herein is adapted for use in connecting ducts or conduits under various service conditions. For example, the coupling is adapted for use in connecting ducts or conduits carrying fluids such as air or other chemical, gas, hot or cold. Additionally, it may be used for connecting ducts or conduits carrying liquids under low pressure, and may even be buried underground.

What I claim is:

1. A sleeve for coupling two sections of duct in axial communication, said sleeve being formed of resilient material, said sleeve having an initial inside diameter when in a relaxed state and being capable of recovery to said initial inside diameter after radial enlargement of said sleeve, said sleeve having a longitudinally extending lap joint whereby the sleeve is adapted for radial enlargement by an outside force so as to be received over adjacent ends of aligned duct sections having larger external diameters than said initial inside diameter of said sleeve with recovery forces in said sleeve adapted to maintain said sleeve in hugging embrace with the duct sections, and said sleeve having sealing means on an inside surface thereof for effecting a sealing contact with outer surfaces of the duct sections.

2. The sleeve of claim 1 wherein the sealing means is an adhesive for adhering the surfaces between which it is resiliently trapped.

3. The sleeve of claim 2 wherein the sealing means is a thermosetting adhesive.

4. The sleeve of claim 1 wherein the sleeve is unitary.

5. The sleeve of claim 1 wherein the sealing means is an activatable adhesive.

6. The sleeve of claim 5 wherein the sealing means is a heat activatable adhesive.

* * * * *